United States Patent

Long

[15] 3,706,335
[45] Dec. 19, 1972

[54] TIRE-REMOVAL DEVICE

[72] Inventor: Robert C. Long, R.D. 1, Box 26, Smithville, Ohio 44677

[22] Filed: March 18, 1971

[21] Appl. No.: 125,540

[52] U.S. Cl. .............................................. 157/1.17
[51] Int. Cl. ........................................... B60c 25/06
[58] Field of Search ......................... 17/1.17, 1.26; 248/354 R, 354 S; 254/108

[56] References Cited

UNITED STATES PATENTS

| 3,300,184 | 1/1967 | Ragolio | 157/1.17 X |
| 945,334 | 1/1910 | Lent | 254/108 |
| 2,523,448 | 9/1950 | Reitz | 157/1.26 |
| 2,687,268 | 8/1954 | Hawes | 248/354 S |
| 2,691,412 | 10/1954 | Wood | 157/1.26 |
| 2,786,517 | 3/1957 | Hammer | 157/1.17 |
| 3,330,421 | 7/1967 | Simmons | 248/354 S |
| 3,332,467 | 7/1967 | Clark | 157/1.17 |

Primary Examiner—Granville Y. Custer, Jr.
Attorney—Gordon C. Mack

[57] ABSTRACT

The tire is placed flat on a floor or other substantially horizontal surface. A jack provided with a tire-removing lip is placed on this with the lip adjacent the rim on which the tire is mounted. The top of the jack is placed under a rafter or other horizontal structural element. By expanding the jack the lip is forced down and disengages the tire from the rim.

5 Claims, 6 Drawing Figures

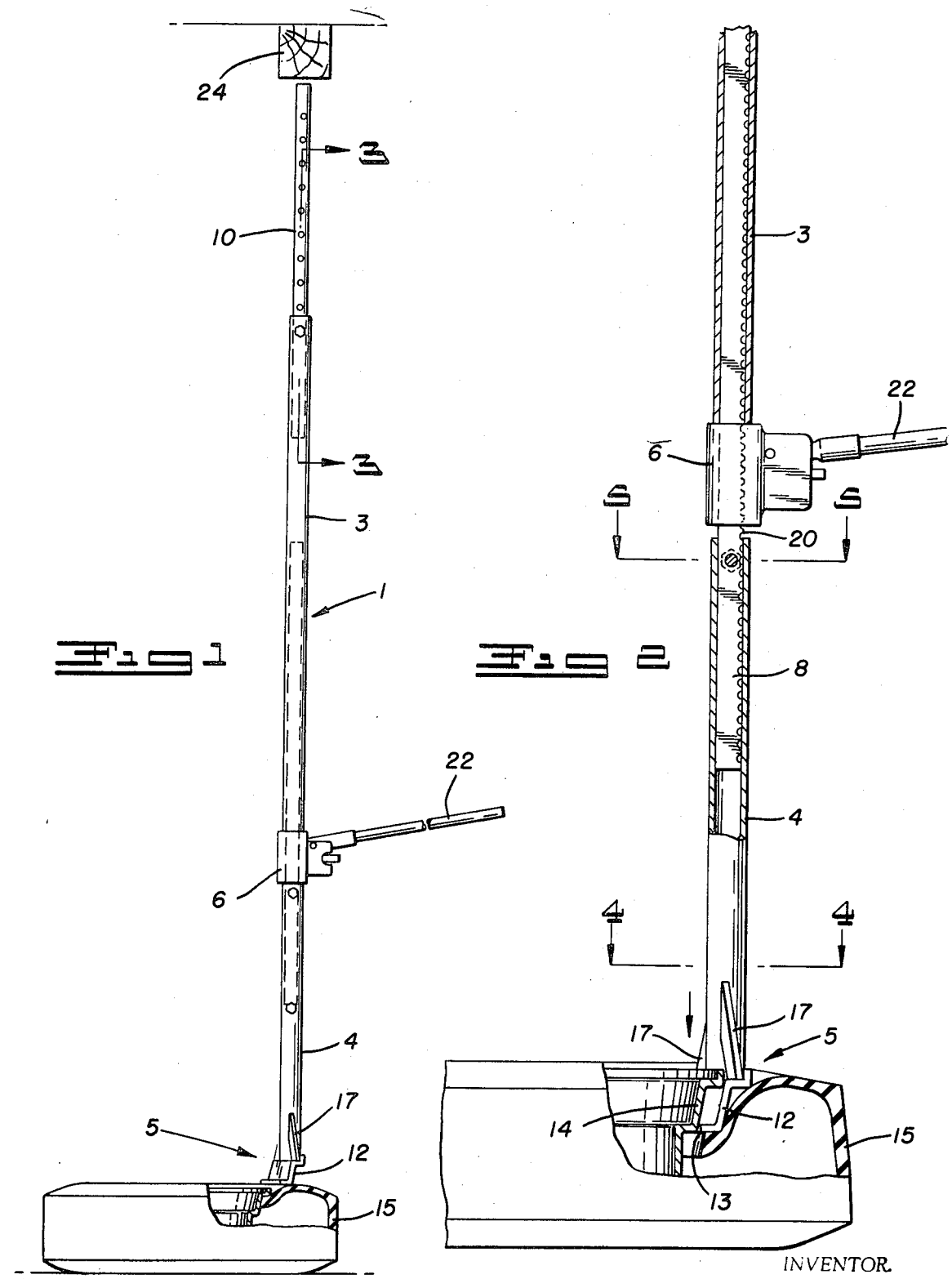

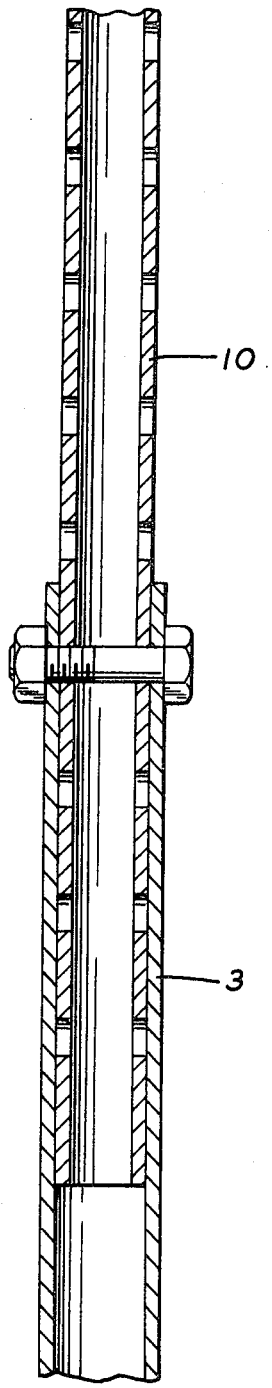
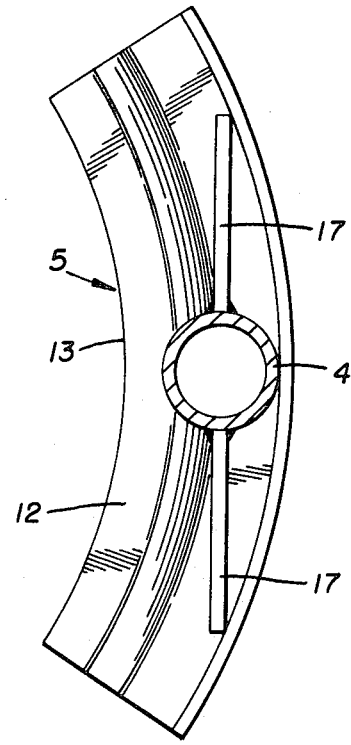
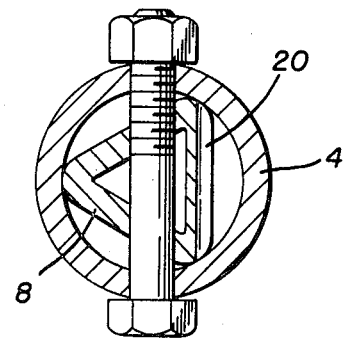

TIRE-REMOVAL DEVICE

The tire-removal device of this invention is designed primarily for use by the owner of a truck or other auto, rather than for use by a commercial institution. However, it may be used in commercial installations.

Applicant's tire-removal device differs from that disclosed in Reitz U.S. Pat. No. 2,523,448 in several respects, although both use a ratchet and the rack on which the ratchet operates is at least partially enclosed. In the Reitz device, this rack extend to the cross member against which pressure is applied, and in applicant's device the rack is fixed in a lower portion of the enclosing means and the ratchet lifts the upper portion of the enclosing means.

The jack of applicant is provided with an arcuate lip or like tire-disengaging means at its lower end. This is placed with its edge adjacent the rim of the wheel on which the tire is mounted. The upper end of the jack is placed under a rafter or other horizontal member to which pressure is to be applied. Then the jack is extended and the tire-disengaging means is pressed away from the rim on which it is mounted.

The removal device comprises upper and lower enclosing members (usually two pipe sections), a rachet on which the upper enclosing member rests, tire-engaging means fastened to the bottom of the lower enclosing member, and a rack within the enclosing members and fastened to the lower enclosing member operated upon by the ratchet to raise the upper enclosing member to which it is fastened. Usually an extension of the upper enclosing member is fastened to it at any one of various positions to adjust the over-all height of the device to meet desired requirements, and the location at which the rack is fastened to the lower enclosing member is also adjustable.

By pumping the handle of the ratchet, the top of the device is pressed against the rafter or the like and the tire is disengaged from its rim.

The invention is further described in connection with the accompanying drawings, in which FIG. 1 is a view of the jack in vertical position resting on a tire with the upper end of the jack close to a rafter or the like;

FIG. 2 is an enlarged view, partly in section, showing parts of the jack enclosing opposite ends of the rack;

FIG. 3 is a section on the line 3—3 of FIG. 1;

FIG. 4 is a plan view on the line 4—4 of FIG. 2; and

FIG. 5 is a section on the line 5—5 of FIG. 2.

The jack 1 is illustrative. Any jack may be used which consists essentially of:

1. A hollow, elongated enclosing member divided into upper and lower portions, 3 and 4,
2. Tire-disengaging means 5 at the bottom of the lower portion 4,
3. A rachet 6 at the bottom of the upper portion 3,
4. An elongated rack 8 partially located within the upper member and partially located in the lower member, and fastened to the lower member, preferably at any one of a plurality of higher and lower positions, and preferably also
5. An extension 10 telescopically engaged with the top of the upper member and fastenable thereto at a number of higher and lower positions.

The upper and lower portions 3 and 4 are advantageously cast-iron pipe sections several inches in diameter.

As best shown in FIGS. 2 and 4, the tire-disengaging means 5 of the drawing is advantageously composed of a stepped portion 12 with an arcuate front edge 13 (FIG. 4) of approximately the radius of the rims from which tires are most likely to be removed. This edge 13 need not fit the edge of the rim 14 of tire 15, but it approximates it. The stepped portion is braced by braces 17. Other tire-disengaging means may be used.

The rack 8 may be triangular in cross section with notches at an exposed angle or across one side as shown in FIG. 5. The cross-sectional shape of the rack is immaterial.

As the handle 22 is pumped, the jack is expanded and abuts the rafter 24, and as the action is continued the lip 12 separates the tire 15 from the rim 14.

I claim:

1. A device for removing a tire from a rim the top of which device is adapted to press against a permanent horizontal member, which device comprises upper and lower hollow upright parts, with tire-disengaging means at the bottom of said lower part and a ratchet at the bottom of said upper part, a rack partly within said upper part and fastened to it, and partly within said lower part and supported by the lower part, notches in the rack engaged by the ratchet, and a pumpable handle affixed to the ratchet which is adapted to raise said upper part into pressure contact with said permanent horizontal member and thus apply pressure to the tire by the tire-disengaging means and thereby disengage the tire from a rim.

2. The device of claim 1 in which the location at which the rack is supported by the lower part is adjustable.

3. The device of claim 1 in which the rack is generally triangular in cross section with the notches thereof at one side of the triangle.

4. The device of claim 1 in which a height-extending member is fastenable at various locations to said upper part.

5. The device of claim 4 in which the bottom of the height-extending member is within said upper part.

* * * * *